Oct. 24, 1939.  E. M. SINGLEY  2,177,229
COMBINE
Filed Nov. 26, 1938  5 Sheets-Sheet 1

E. M. Singley INVENTOR.
BY [signature]
ATTORNEYS.

Oct. 24, 1939.  E. M. SINGLEY  2,177,229
COMBINE
Filed Nov. 26, 1938   5 Sheets-Sheet 3

Fig. 3.

E. M. Singley INVENTOR.

BY C.H.Snow&Co.

ATTORNEYS.

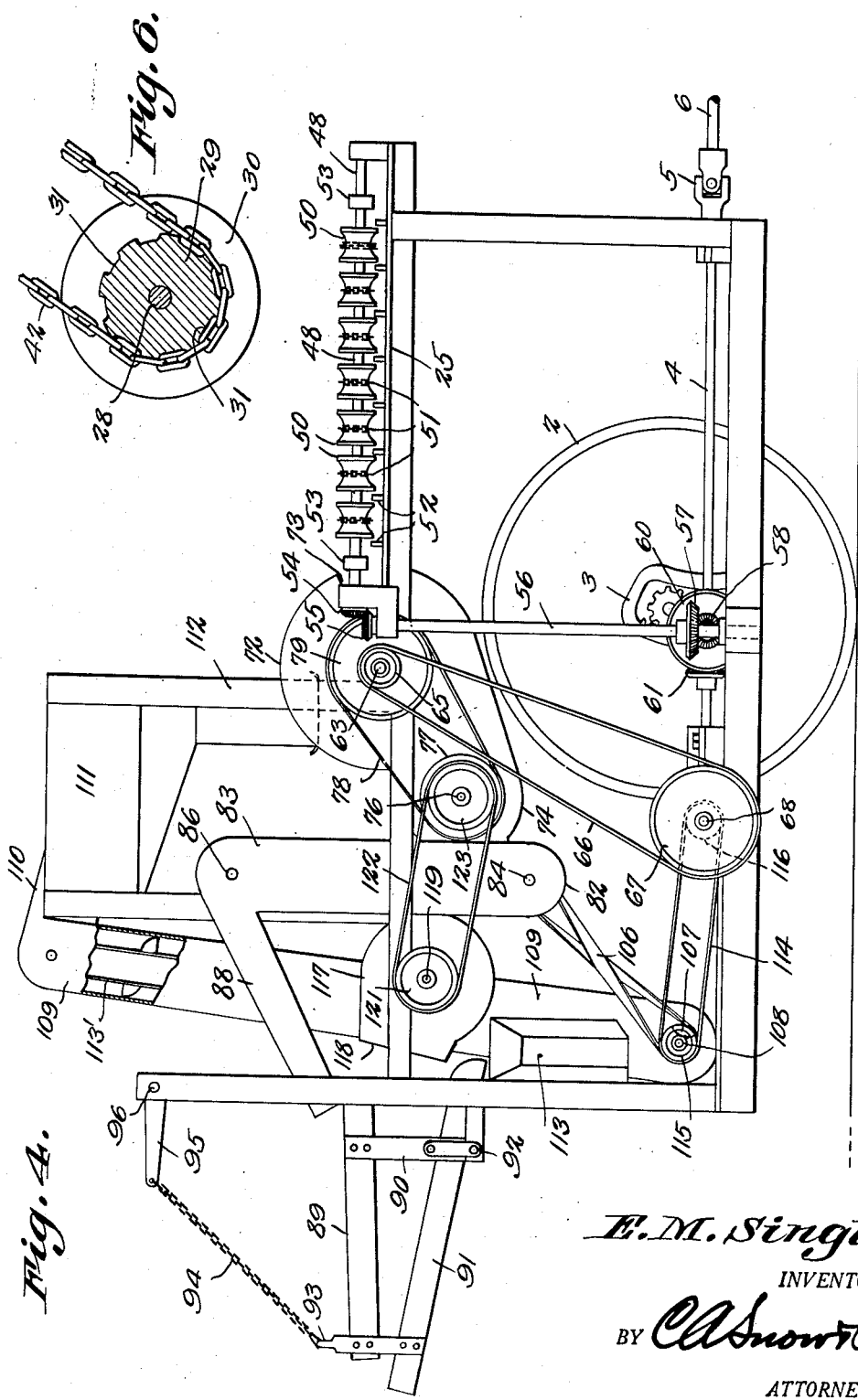

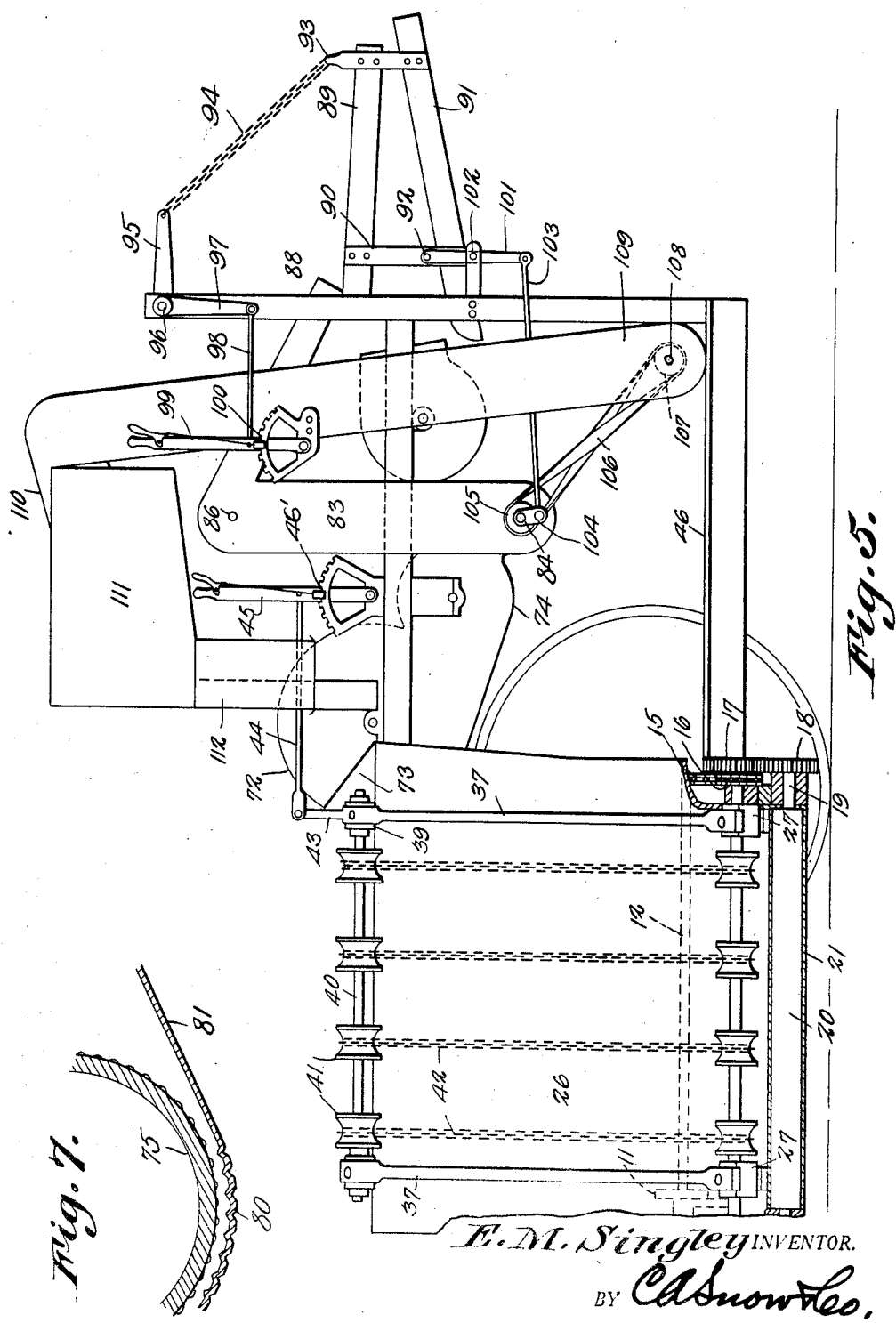

Patented Oct. 24, 1939

2,177,229

UNITED STATES PATENT OFFICE 2,177,229

COMBINE

Elder M. Singley, Lewiston, Pa.

Application November 26, 1938, Serial No. 242,595

10 Claims. (Cl. 130—27)

This invention relates to a combine, one of the objects being to provide a light, simple and inexpensive machine of this type which can be drawn readily over a field of growing grain and will operate automatically to harvest the grain, thresh it, subject it to the action of a separator, and then deposit the grain in a bin or hopper from which it can be delivered as desired.

A further object is to provide a combine in which a continuous operation is set up, the threshing mechanism being such as to act only upon the heads of the grain while the straw is being conveyed through the machine in a prone position.

A still further object is to provide a combine adjustable readily to thresh stands of grain of different heights as they are encountered in the field, the grain in every instance being conveyed from the point of harvesting through the machine in a prone condition in such manner as properly to feed the heads of the grain to the threshing elements.

A still further object is to provide threshing means which will act efficiently on grain of different heights within certain limits following each adjustment of the machine.

Another object is to provide a machine the mechanism of which is of such a nature as to require the services of only a single attendant while the machine is being drawn by a tractor or the like during the harvesting and threshing operation.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 3 is a section on line 3—3, Figure 1.

Figure 4 is an elevation of one side of the machine.

Figure 5 is a view partly in section and partly in elevation of the machine as viewed from the opposite side.

Figure 6 is an enlarged section through one of the chain-carrying pulleys, a portion of a chain in engagement therewith being shown.

Figure 7 is an enlarged section through the grain scrubbing means.

Figure 1:
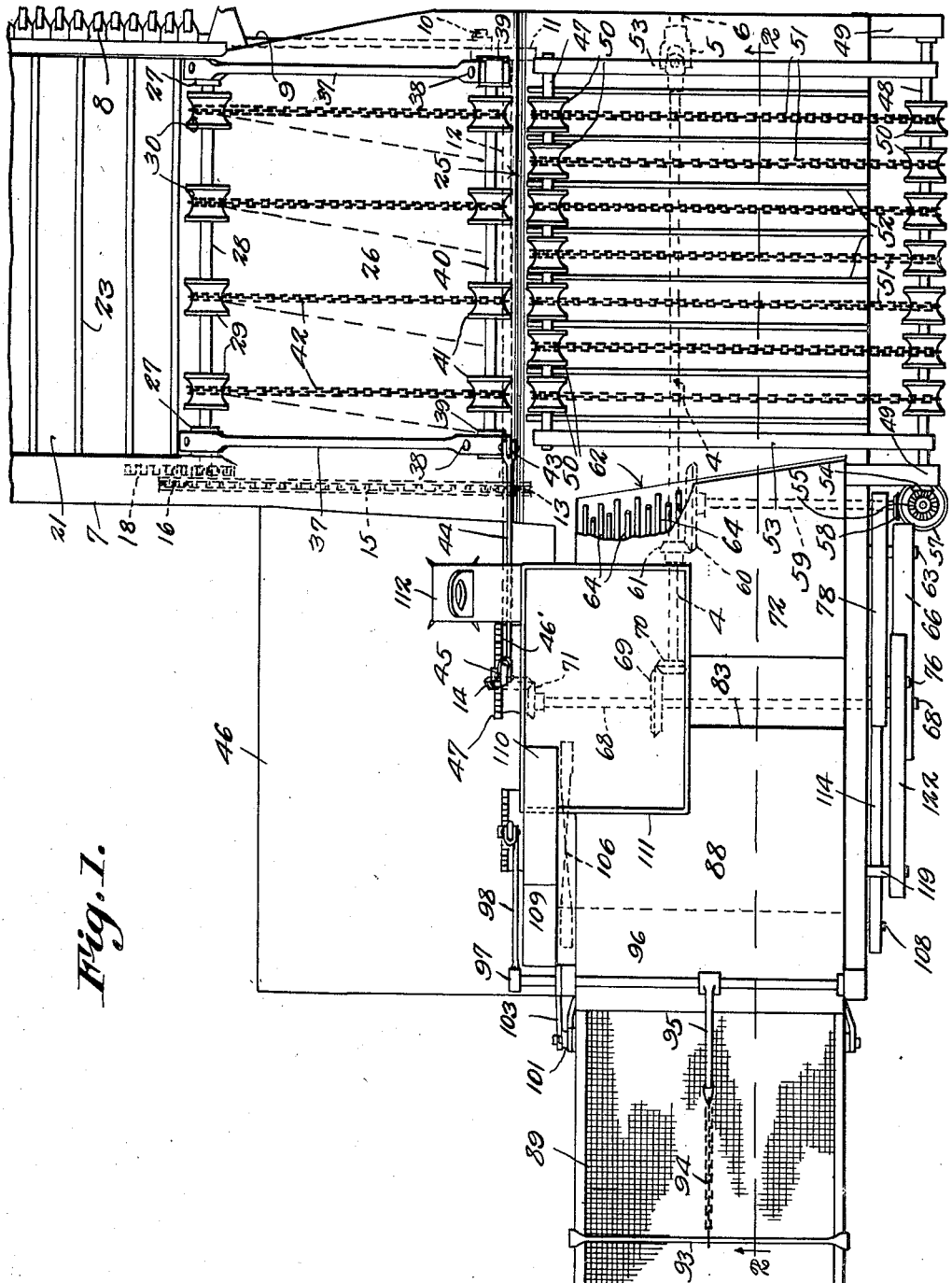
Figure 1 is a plan view of the machine, a portion being broken away.
Figure 2:
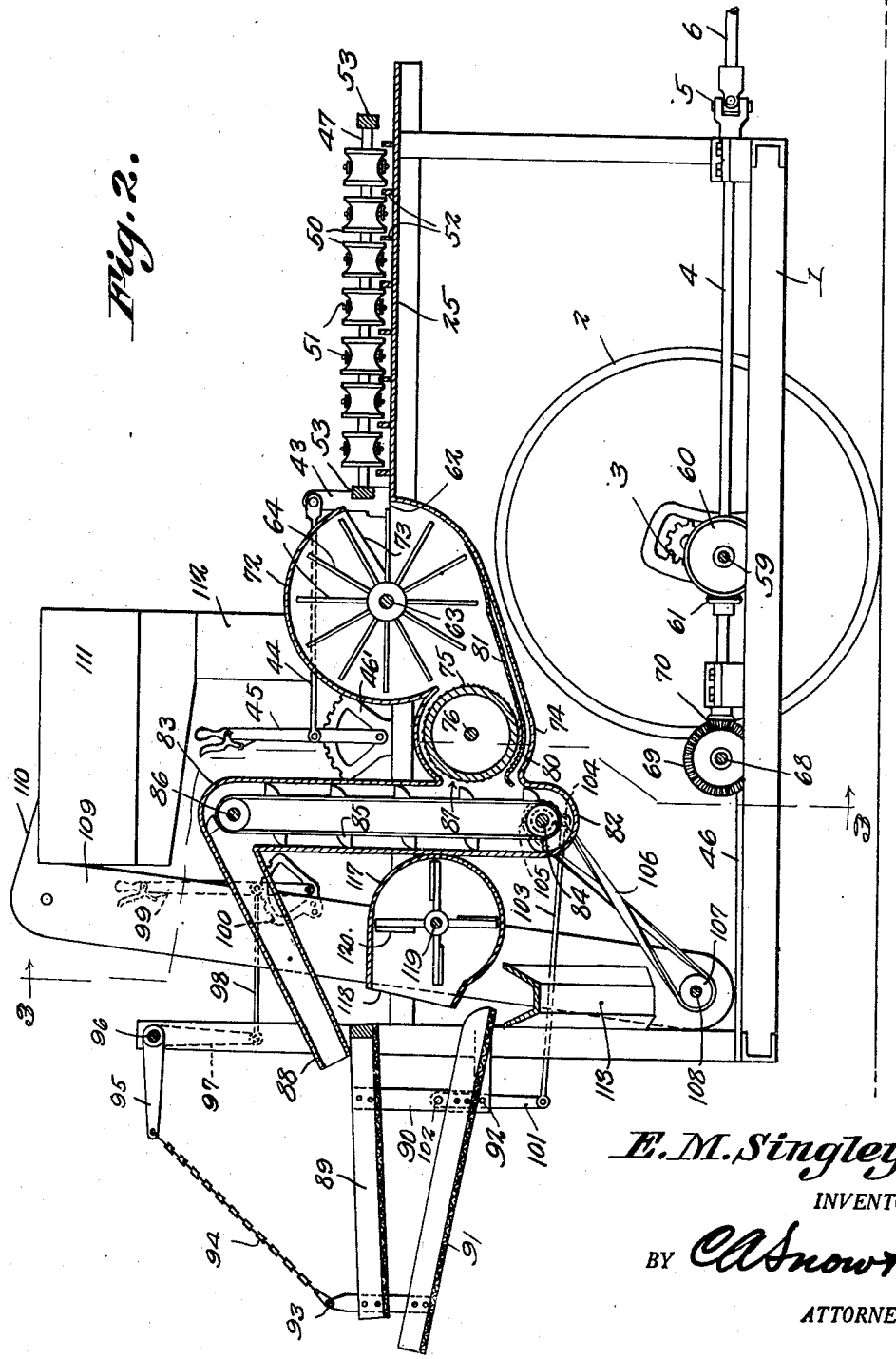
Figure 2 is a section on line 2—2, Figure 1.

Referring to the figures by characters of reference 1 designates a frame having supporting wheels 2 at the sides thereof, it being understood that any suitable means, shown generally at 3, can be employed for raising and lowering the frame relative to the wheels. This frame is provided with a longitudinal drive shaft 4 adapted to be joined by a universal connection 5, to a power shaft 6 extending from a tractor (not shown) used for the purpose of drawing the combine over the field where the grain is to be harvested and threshed.

Frame 1 is formed with a laterally extending portion 7 at the front thereof and this extension has the usual means, along the front or advancing edge thereof, for harvesting grain. As shown in the drawings this means consists of a reciprocating toothed bar, 8, as commonly employed and which is adapted to be actuated by a pitman 9 extending laterally within the frame and engaging a wrist-pin 10 extending from a disk 11. This disk is carried by one end of a transverse shaft 12 journalled in the frame and extending rearwardly within the lateral extension 7.

The rear end of shaft 12 is provided with a sprocket 13 and a gear 14, the sprocket 13 serving to transmit motion through a chain 15 to another sprocket 16 which is mounted for rotation with a gear 17. This gear meshes with a gear 18 which, as shown particularly in Figure 5, is fastened to the shaft 19 of a roll 20 which is located in frame extension 7 and is engaged by an endless apron 21. This apron is mounted for movement laterally of the machine within extension 7, it being supported at the outer side by a roll 22. The apron can be formed with cleats 23 extending transversely thereof and backwardly from the sickle bar 8. Obviously, from the foregoing description, as the machine moves forwardly the reciprocating sickle bar will cut through the standing grain so that it will fall backwardly onto the apron 21, this apron moving transversely of the machine toward the main frame 1. The proper positioning of the grain on the apron 21 can be facilitated by employing the usual reel 24 above the sickle bar and driven by any suitable connections with the mechanism of the machine. As the employment of a reel for this purpose is well known, it has not been deemed necessary to show or describe this driving connection.

A threshing table 25 is carried by frame 1 at the front thereof beyond one end of the sickle bar 8 and an inclined deck 26 extends downwardly from the inner side of table 25 to the delivery end of the apron 21 which apron travels in the direction indicated by the arrow in Figure 1. The lower corner portions of the inclined deck 26 are provided with bearing blocks 27 in which is journalled a shaft 28 carrying spaced pulleys 29. Each pulley has a peripheral channel 30 the inner surface of which is provided with regularly spaced recesses or pockets 31 so that an ordinary link chain can be seated in the groove 30 and will be actuated by the pulley when rotated.

Parallel arms 32 are pivotally connected at their lower ends to the respective blocks 27 and are extended upwardly over the inclined deck 26, the upper ends of these arms being pivotally joined, as at 38, to bearing blocks 39 spaced apart a distance equal to the distance between the blocks 27. A shaft 40 is journalled in these blocks 39 and this shaft cooperates with arms 32 and shaft 28 to form a parallelogram.

Mounted on shaft 40 are pulleys 41 similar to the pulleys 29 and equal in number thereto. These pulleys 29 and 41 are engaged by parallel endless belts such as chains 42 the links of which, as before stated, are adapted to become seated successively in the pockets 31 in the pulleys 29. Thus when shaft 12 is actuated as hereinafter explained and apron 21 is moved in the direction of the arrows in Figures 1 and 3 while the sickle bar is being reciprocated, the shaft 28 will be rotated to cause the lower flight of the chain 42 to move upwardly and to drag therewith prone grain fed onto the lower portion of the inclined deck 26 and while the grain is extending backwardly on the surface supporting it.

One of the blocks 39 is provided with an arm 43 (see Fig. 5) which is connected by a rod 44 to a lever 45 located where it can be reached conveniently by the attendant standing on a platform 46 located at one side of the main frame and back of the extension 7. The usual pawl and segment locking means indicated generally at 46', can be used for holding lever 45 in any position to which it may be adjusted. Obviously by means of this lever the operator can shift block 39 forwardly or backwardly and as the chains 42 and arms 37 are all parallel, this adjustment will result in the chains being swung forwardly or backwardly relative to the pulleys 29. Thus as the chains are operating to draw prone grain laterally up the inclined deck 26, they can also shift the grain rearwardly or forwardly on the deck.

As before stated the inclined deck 26 leads to one side of the threshing table 25. A shaft 47 is located above the inner side of table 25 and is parallel with and adjacent to shaft 40. Another shaft 48, parallel with shaft 47, is located beyond the outer side of table 25, it being mounted in suitable bearings 49 provided therefor. Both of these shafts 47 and 48 are provided with pulleys 50 having peripheral grooves and arranged in pairs, there being an endless drag chain 51 mounted on the pulleys of each pair and with its lower flight adjacent to the top surface of the table. Between these chains the table is provided with supporting ribs 52 which extend upwardly toward the level of the lower flights of chains 51. Consequently when prone grain is transferred from the inclined deck 26 into position between table 25 and the lower flights of the chain 51, it will not only be drawn toward the outer side of the table but will also be crimped between the chains and the ribs 52, thereby being held against movement or displacement longitudinally of the prone grain. The bearings for the shaft 47 are not fixed but are in the form of parallel arms 53 pivotally mounted at one end on the shaft 48 so that shaft 47 and the chains mounted on the pulleys are thus free to swing toward and from table 25 thereby to adapt the chain to the thickness of the mass of prone grain being fed along the ribs 52 by chains 51.

Shaft 48 is provided at its rear end with a gear 54 which receives motion through a gear 55 from a downwardly extending shaft 56 having a gear 57 secured thereto near its lower end. This latter gear meshes with a gear 58 secured to a short transverse shaft 59 which, in turn, receives motion through a gear 60 from a gear 61 secured to the drive shaft 4. Thus operation of the drive shaft will result in actuation of the chains 51 the lower flights of which will move laterally toward the outer side of the machine, dragging with them the grain supplied thereto by the chains 42.

The rear edge of the threshing table 25 is obliquely disposed, as shown at 62, said edge being extended inwardly and rearwardly from the outer side of table 25 so that the distance between the front edge of said table and the inner end of the edge 62 is greater than the distance between the outer end of said edge and the front edge of the table.

Back of the oblique edge 62 of the threshing table is located a transverse shaft 63 and on this shaft is a threshing element in the form of a conical brush 64 formed of rods radiating from the shaft, the pitch of the cone corresponding with the angle of the threshing edge 62 so that the cone will work parallel with the edge without contacting therewith. The shaft 63 of this threshing element is provided with a pulley 65 adapted to receive motion through a belt 66 from a pulley 67 carried by a transverse shaft 68 which, in turn, receives motion from drive shaft 4 through meshing gears 69 and 70 and, in turn, transmit motion through a gear 71 to the gear 14 on shaft 12.

The threshing element 64 is located preferably in a housing 72 having an inlet 73 at the threshing edge of the table 25 and the bottom of this housing 72 is inclined downwardly and rearwardly to a concave 74 above which is located a scrubbing cylinder 75 the shaft 76 of which is driven in any suitable manner, as by means of a pulley 77 thereon receiving motion through a belt 78 from a pulley 79 on shaft 63. This scrubbing cylinder can be of any preferred construction and cooperates with a concave plate 80 provided at one end of a resilient support 81, this concave being roughened in any suitable manner. Thus grain thrown downwardly from the threshing edge 62 of table 25 will travel along the resilient supporting plate 81 to the roughened concave 80 so that any chaff adhering to the grain will be rubbed off at this point.

Concave 74 merges into the upper portion of a trough 82 at the lower end of an elevator housing 83, there being a transverse shaft 84 within the trough on which is mounted the lower portion of an endless elevator 85 which extends upwardly in housing 83 to a supporting shaft 86 in the upper portion of the housing. The housing is of course provided with an inlet 87 through which grain is delivered into the elevator housing from the scourer.

Elevator housing 83 has a delivery spout 88 at its upper end through which grain is directed downwardly onto an upper inclined screen 89 carried by a pivoted frame 90 in which is located a lower screen 91. These two screens are oppositely inclined but are fixed relative to each other, the screens and their frames being mounted to oscillate about a pivot 92. A bail 93 is connected to and bridges the outlet or lower end of the upper screen 89 and is engaged by a supporting chain 94 or the like attached to an arm 95 carried by a transverse shaft 96. This shaft has a depending arm 97 connected by a rod 98 to an adjusting lever 99 located where it can be reached conveniently by the occupant of the platform 46 and adapted to be fastened in any desired position by the usual pawl and rack means indicated generally at 100. Obviously by shifting this lever the arm 95 can be swung upwardly or downwardly, thereby to swing the screens 89 and 91 about the axis 92.

A lever 101 is mounted on the pivot 102 and has its upper end pivotally connected to frame 90 as indicated at 92. A connecting rod 103 is attached to the lower end of lever 101 and to a crank 104 secured to shaft 84. Thus when this shaft is rotated the lever 101 will be oscillated and the two screens 89 and 91 will be caused to swing from chain 94 because of the thrust transmitted through pivot 92 to frame 90.

A pulley 105 is secured to shaft 84 and transmits motion through a belt 106 to a pulley 107 secured to the lower shaft 108 of an elevator located within a housing 109. This housing has an outlet spout 110 at its upper end for delivering grain into a bin or hopper 111. An outlet spout 112 extends downwardly from this bin and is employed for delivering grain as desired. Grain is delivered to the lower portion of housing 109 by a spout 113 which receives the tailings from screen 91. Thus the grain is adapted to be carried upwardly by elevator 113' to bin 111 after it has been thoroughly cleaned and separated.

For the purpose of actuating elevator 113' a belt 114 can be employed for transmitting motion to a pulley 115 on shaft 108 from a pulley 116 on shaft 68.

A blower housing 117 is located adjacent to the screens 89 and 91 and has an outlet 118 so that an air current set up by a blower in the housing will be directed between the screens and will act to blow away chaff and other light particles. A shaft 119 in housing 117 carries the blower 120 and has a pulley 121 which receives motion through a belt 122 from a pulley 123 on shaft 76.

When the machine moves forwardly behind a tractor or other pulling means, motion is adapted to be transmitted to the mechanism of the combine from shaft 6 of the tractor. The operation of this mechanism will cause simultaneous reciprocation of the cutter bar or sickle 8, movement of the apron 21 toward the inclined deck 26, actuation of the chains 42 and 51, rotation of the threshing element 64 at high speed, and operation of the scouring or scrubbing cylinder 75, elevators 85 and 113' and blower 120. Reel 24 also will be operated in the usual manner. Consequently the advance of the machine over a field of standing grain will result in the sickle or cutter bar 8 cutting through the grain so that it will fall backwardly into prone position on apron 21 with the heads of the grain adjacent to the back of the apron and said grain lying substantially at right angles to its path of movement with apron 21. As the grain reaches the lower end of the inclined deck 26 it will be engaged by the chains 42 the lower flights of which will bear downwardly on the grain so that as said flights move upwardly, the grain will be drawn therewith to the table 25. Here the prone grain will be brought under the chains 51 the lower flights of which will draw the prone grain along the ribs 52 which thus will cooperate with the chains to crimp the grain as before stated and prevent it from being pulled longitudinally during the threshing operation. While the grain is being drawn along the ribs the heads of the grain will project past the oblique threshing edge 62 where they will be engaged by the downwardly moving rods of the threshing element 64 and thrown downwardly within housing 72 while the straw is carried on over the table 25 and delivered from the side of the machine. As the cooperating threshing edge 62 and element 64 are obliquely disposed, they will act upon the heads of all grain the height of which is in certain predetermined limits. In other words if some of the grain in the mass being fed over the table is slightly longer than the remaining grain, the heads of the longer grain will first project over the edge 62 and be threshed while the heads of the shorter grain will gradually move outwardly from the threshing edge as they approach the outer end of said edge.

The grain delivered into the housing 72 is scrubbed between cylinder 75 and concave 80 and delivered to elevator 85. This carries it upwardly for delivery to screen 89 which is rapidly oscillated with screen 91 so that the completely separated grain is delivered as tailings into elevator housing 109 where elevator 113' carries it to bin 111. Blower 120 of course blows away any chaff mixed with the grain while travelling over the screen.

As before stated when the grain is directed onto table 25 the heads thereof, if the grain is of normal height, will be properly positioned to extend over and beyond the threshing edge 62 where they can be operated upon by the threshing element 64. However should the stand of grain be below normal or medium, the operator, noticing that fact, shifts lever 45 so as to move shaft 40 rearwardly. This will cause the chains 42 to move to oblique positions so that they extend laterally and rearwardly as indicated by broken lines at 42' in Figure 1. Thus instead of being drawn upwardly along the deck 26 without being shifted longitudinally of the grain, said grain will be gradually pulled rearwardly by the chains. Consequently when the grain is brought to the table 25, the heads will be located where they will extend properly beyond the threshing edge 62 and into the path of the threshing element 64. Should the operator notice that the stand of grain is higher than average, he would reverse the foregoing operation by shifting shaft 40 forwardly, thereby causing the chains to incline laterally and forwardly. This would result in the grain being drawn gradually in a forward direction as it is carried up the inclined deck so that the heads would not extend too far beyond the threshing edge 62 but would be located properly in relation thereto so as to be engaged by the threshing element 64.

The foregoing means for regulating the position of the grain as it is fed within the machine is of considerable importance in fields where the grain is of different heights. It also permits quick adjustment of the machine for use on different fields where the average height of the grain differs.

Attention is directed to the fact that after the grain is once cut, it is carried continuously through the machine. The straw is not fed to the threshing element but is kept clear therefrom so that less power thus is required to effect the threshing operation than where all of the material is directed between said threshing elements. In the present case the straw is delivered at the side of the machine from the deck 26 and only the grain and the chaff are engaged by the threshing elements 62 and 64, the desirable threshing and pouring operation taking place subsequently thereto within the machine without requiring any attention other than that which can be given by the one operator on the platform 46.

What is claimed is:

1. In a combine a table supported for movement in one direction, means for conveying prone grain across the table in a direction perpendicular to the direction of movement of the table and maintaining the grain substantially parallel to the direction or path of movement of the table, a conical threshing element rotatable about an axis extending perpendicularly to said path of movement of the table, said element being tapered in the direction of the grain receiving side of the table, said table having a threshing edge at the back thereof substantially parallel with the periphery of the threshing element and cooperating with said element to engage successively the heads of grain of different lengths.

2. In a combine a table, a tapered rotatable threshing element cooperating with and extending along one edge of the table, said edge being obliquely disposed and substantially parallel with the periphery of said element, means for moving prone grain across the table transversely of the grain and along lines substantially parallel with the axis of rotation of said element thereby to position the heads of grain of different lengths for engagement by said element and said oblique edge, the threshing element being tapered oppositely to the direction of movement of the grain.

3. In a combine a table having an obliquely disposed threshing edge, a tapered threshing cylinder cooperating with said edge, the edge being substantially parallel with the periphery of the cylinder, means for delivering grain in a prone position and transversely of the grain to one side portion of the table and to the small end of the cylinder and the adjacent end of the threshing edge, and means for conveying the prone grain transversely of the grain along lines substantially parallel to the axis of rotation of the cylinder and across the table to position the heads of grain of different lengths beyond said edge and in the path of the cylinder.

4. In a combine a table having an oblique threshing edge, a rotatable, tapered threshing cylinder cooperating with said edge and having its periphery substantially parallel therewith, means for feeding prone grain sidewise across said table and along lines substantially parallel with the axis of rotation of the cylinder, and means for directing prone grain sidewise onto the table with the heads of the grain adjacent to the threshing edge and to the small end of the cylinder.

5. In a combine a table having an oblique threshing edge, a tapered threshing cylinder mounted for rotation and extending to the sides of the table, said cylinder having its periphery substantially parallel with said edge, and means for conveying prone grain sidewise across the table along lines substantially parallel with the axis of rotation of the cylinder and with the heads of the grain adjacent to said edge, the small end of the cylinder being positioned to first engage the grain on the table.

6. In a combine a table having an oblique threshing edge, a tapered threshing cylinder mounted for rotation and extending to the sides of the table, said cylinder having its periphery substantially parallel with said edge, elevating means for conveying prone grain sidewise to that side of the table at the small end of the cylinder, and means for conveying the prone grain sidewise across the table along lines substantially parallel with the axis of rotation of the cylinder and with its heads adjacent to the threshing edge.

7. In a combine a table having an oblique threshing edge, a tapered threshing cylinder mounted for rotation and extending to the sides of the table, said cylinder having its periphery substantially parallel with said edge, elevating means for conveying prone grain sidewise to that side of the table at the small end of the cylinder, means for conveying the prone grain sidewise across the table along lines substantially parallel with the axis of rotation of the cylinder and with its heads adjacent to the threshing edge, and means for adjusting the elevating means angularly transversely of the path of movement of the prone grain to shift the grain in the direction of its length while moving sidewise toward the table thereby to bring the grain heads into proper position for engagement by the cylinder and threshing edge.

8. In a combine a table having an oblique threshing edge, a tapered threshing cylinder mounted for rotation and extending to the sides of the table, said cylinder having its periphery substantially parallel with said edge, elevating means for conveying prone grain sidewise to that side of the table at the small end of the cylinder, and means for conveying the prone grain sidewise across the table along lines substantially parallel with the axis of rotation of the cylinder and with its heads adjacent to the threshing edge, and means for adjusting the elevating means angularly transversely of the path of movement of the prone grain to shift the grain in the direction of its length while moving sidewise toward the table thereby to bring the grain heads into proper position for engagement by the cylinder and threshing edge, said elevating means including parallel inclined endless belts leading to one side of the table, means for driving the belts simultaneously in the same direction to carry the prone grain sidewise, and means for shifting the upper portions of the belts substantially parallel to the direction of their axis of rotation thereby to shift the prone grain lengthwise while being elevated.

9. In a combine a table mounted for forward movement, a tapered threshing cylinder back of the table and rotatable about an axis extending transversely of the path of movement of the table, said table having a rear threshing edge substantially parallel with the periphery of the cylinder, means for elevating prone grain crosswise to that side of the table nearest the small end of the cylinder, means for depositing grain of different lengths on the elevating means with the heads of the grain extending backwardly, and means for conveying the prone grain sidewise from the elevating means across the table along lines parallel with the axis of rotation of the cylinder with the heads of the grain in backwardly extended positions for engagement by the cooperating threshing edge and cylinder at points along said edge determined by the length of the grain.

10. In a combine a table mounted for forward movement, a tapered threshing cylinder back of the table and rotatable about an axis extending transversely of the path of movement of the table, said table having a rear threshing edge substantially parallel with the periphery of the cylinder, means for elevating prone grain crosswise to that side of the table nearest the small end of the cylinder, means for depositing grain of different lengths on the elevating means with the heads of the grain extending backwardly, and means for conveying the prone grain sidewise from the elevating means across the table with the heads of the grain in backwardly extended positions for engagement by the cooperating threshing edge and cylinder at points along said edge determined by the length of the grain, said elevating means including inclined endless chains in parallel relation, means for driving the chains simultaneously in the same direction, and means for shifting the upper portions of the chains transversely of their paths of movement thereby to move the grain lengthwise backwardly or forwardly toward or from the axis of rotation of the cylinder during the sidewise travel of the grain toward the table and cylinder.

ELDER M. SINGLEY.